United States Patent [19]
Chaplin

[11] Patent Number: 5,400,081
[45] Date of Patent: Mar. 21, 1995

[54] CHROMA KEYER WITH CORRECTION FOR BACKGROUND DEFECTS

[75] Inventor: Daniel J. Chaplin, Nevada City, Calif.

[73] Assignee: The Grass Valley Group, Inc., Nevada City, Calif.

[21] Appl. No.: 196,737

[22] Filed: Feb. 15, 1994

[51] Int. Cl.⁶ .......................................... H04N 9/75
[52] U.S. Cl. .................................. 348/587; 348/592
[58] Field of Search ............... 348/587, 592, 591, 586, 348/590; H04N 9/75

[56] References Cited

U.S. PATENT DOCUMENTS

| | | | |
|---|---|---|---|
| 4,319,266 | 3/1982 | Bannister | 358/22 |
| 4,589,013 | 5/1986 | Vlahos et al. | 348/587 |
| 4,625,231 | 11/1986 | Vlahos | 348/587 |
| 5,032,901 | 7/1991 | Vlahos | 358/22 |
| 5,249,039 | 9/1993 | Chaplin | 358/22 |
| 5,251,016 | 10/1993 | Delwiche | 358/22 |

Primary Examiner—Victor R. Kostak
Attorney, Agent, or Firm—Francis I. Gray

[57] ABSTRACT

A chroma keyer with correction for background defects generates a control signal that does not include variations associated with the background defects. The chroma magnitude of a reference signal that represents a chroma key set with a color background scene without a foreground object is used as a divisor for a hue select signal generated by a hue selector from a chrominance component of an input signal that represents the chroma key set with the foreground object to produce a chroma key control signal. The chroma key control signal is combined with the reference signal to produce a control signal for background suppression. The chroma key control signal also is input to a key circuit to produce a key signal for shaping a new background scene. The reference signal also may be combined with a uniform color signal from a reference matte generator to produce an error signal that is combined with the chroma key control signal to produce the control signal for correction of the background defects in the input signal.

14 Claims, 6 Drawing Sheets

ND EFECTS

BACKGROUND OF THE INVENTION

The present invention relates to a chroma keyer for creating a video special effect, and more particularly to a chroma keyer with correction for background defects such as uneven lighting level and/or color temperature, creases and wrinkles, smudges, and use of colors with variations in luminance to chrominance ratios.

Figure 1:
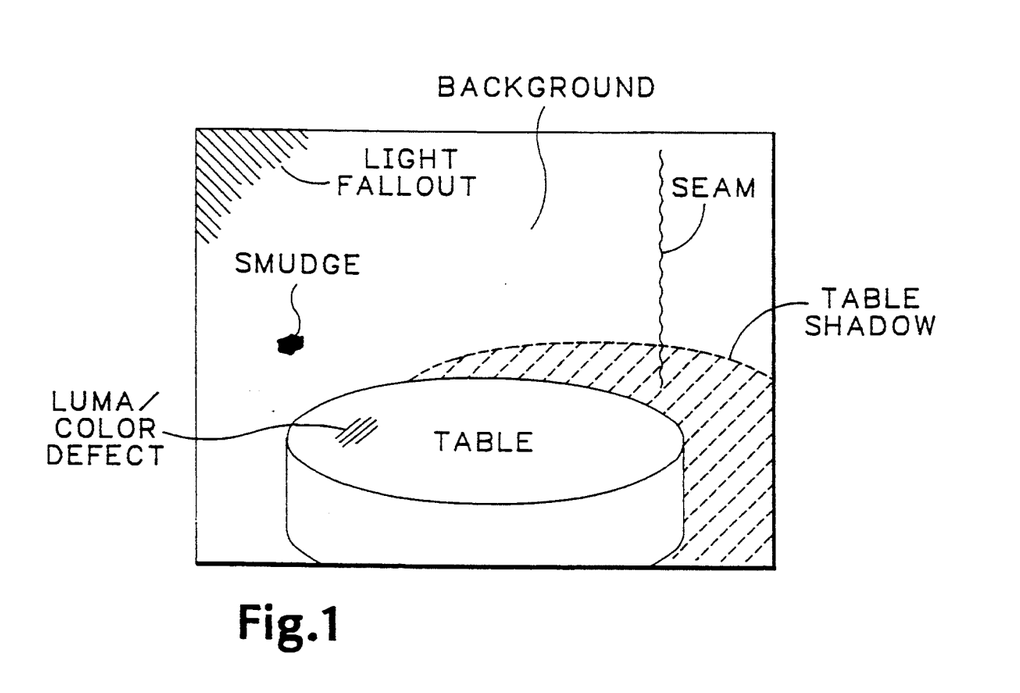
FIG. 1 is a pictorial view of a color background scene having various defects.
Figure 2:
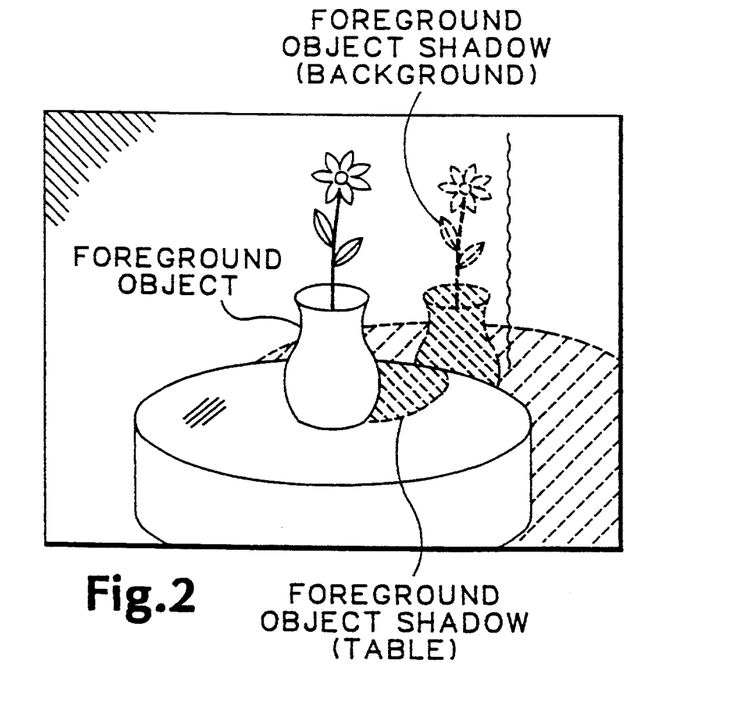
FIG. 2 is a pictorial view of the color background scene of FIG. 1 with a foreground object.
Figure 3:
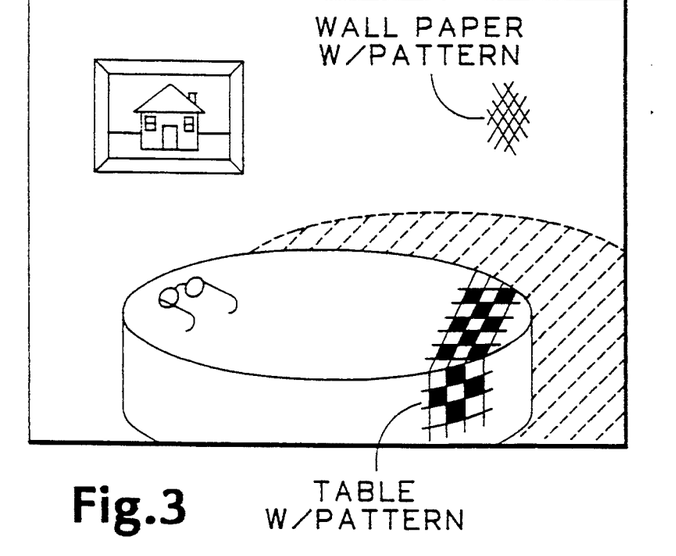
FIG. 3 is a pictorial view of a new background scene.
Figure 4:
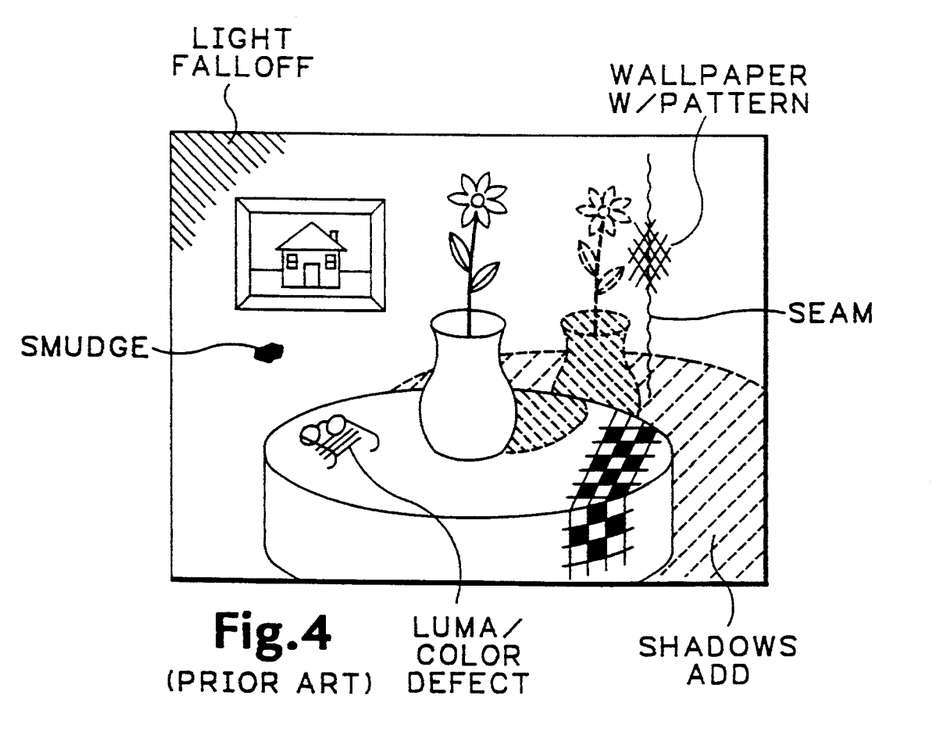
FIG. 4 is a pictorial view of a composite image formed from the new background scene and the foreground object as produced by a prior art chroma keyer.

A typical real setup, or chroma key set, (FIG. 2) has a foreground object or scene, such as a flower vase, placed in front of a uniform color background scene (FIG. 1), usually blue or green. The chroma key set is then shot with a video camera. The video output of the camera is modified by a chroma keying source to replace the color background scene with a new background scene (FIG. 3), such as a room with a table and other objects. The result is a visual effect that makes the foreground scene appear as though it were in front of the new background scene (FIG. 4). In film a similar technique is called "matting".

Traditional chroma keying circuits have not always been able to produce results that are free of unwanted artifacts. In particular artifacts result when the color background scene is not a perfect, uniform color and luminance. Nonuniformity in the color background scene (FIG. 1), such as uneven lighting level and/or color temperature, creases and wrinkles, smudges, and use of colors with variations in luminance to chrominance ratios, require compromises in the way that the chroma key circuit is set up. For example a common practice used in creating a chroma key effect is to place props in the chroma key set that have the same color as the color background scene. These props may represent rocks, tables, chairs, or any such object that the foreground object may sit on or move around. The props should have the same luminance to chrominance ratio in the paint applied to them so that they match the color background scene. Yet they often do not. When the props do not match, the luminance suppression in most traditional chroma key circuits becomes difficult since the luminance suppression is based on the chrominance suppression by a proportionality constant. If the luminance suppression is adjusted for the color background scene, it is not correct for the props—it is either insufficiently suppressed or oversuppressed. If the luminance suppression is adjusted for the props, then the color background scene is similarly improperly suppressed. Oversuppression causes edges of the foreground object to be degraded so that detail in the edge is lost. Undersuppression causes the new background scene in the composite image to be of incorrect luminance level. An operator has to decide which artifact is least harmful for a particular effect desired.

A similar problem applies with uneven lighting, smudges, and wrinkles in the chroma key set. For this case suppression of the color background scene works fine, but conditioning of the new background scene is compromised because a control signal from the chroma keying circuit, applied to the new background scene to cut a hole in it where the foreground object is, must be conditioned so that it does not respond to the smudges, wrinkles and lighting defects. This requires gain and clipping to be applied, and the more gain necessary, the more the edges between the new background scene and the foreground object are degraded. The edges take on a hard appearance and detail is lost.

A related problem occurs when the colored prop is placed in the chroma key set. The prop necessarily has shadows on it, or casts shadows onto other parts of the set. Even with even lighting objects in the set have the appearance of uneven lighting because of the way light reflects unevenly at different angles and from different types of surfaces. These variations also require application of clip and gain to the chroma control signal, and result in loss of edge detail.

Where the lighting does not have a uniform color temperature, most chroma key circuits have imperfect chrominance suppression because most chroma key circuits use a pure color in the suppression process. The residue of imperfect chrominance suppression adds to the new background scene, causing areas in the composite image to be polluted with hue errors (FIG. 4).

So chroma key sets with defects in the color background scene as described above cause undesirable artifacts in the resulting chroma key effect. One would like to make the color background scene ideal, i.e., completely uniform from the point of view of the camera, but in practice this is not possible by making adjustments to the set or its lighting, especially when props are used.

U.S. Pat. No. 5,032,901 issued Jul. 16, 1991 to Petro Vlahos entitled "Backing Color and Luminance Nonuniformity Compensation for Linear Image Compositing"; incorporated herein by reference describes two methods for correcting chroma key operation based on a reference image of the color background scene without the foreground object in place. The circuit shown in FIG. 13A U.S. Pat. No. 5,032,901 has a block 121 that generates the chroma key signal used to shape the new background scene, using a hue selector and a reference image. The hue selector is placed before an embedded storage device that normalizes the output from the hue selector which is used only for shaping the new background scene. Circuits 112, 115 of FIG. 13A show suppression circuits including correction for defects in the color background scene. The approach disclosed is similar to a traditional chroma key circuit, i.e., it shapes a uniform matte signal and a constant luminance to chrominance ratio with the output of a traditional hue selector, which responds to the defects in the color background scene, and subtracts the result from the color background scene. When the imperfect color background scene without the foreground object is suppressed, the result of the suppression is an error due to the defects. The error is stored in a memory and shaped by the output of the hue selector so that it does not respond to the foreground object. When the color background scene with the foreground object is processed, the shaped error output from the memory is used to remove the residual error in the color background scene. FIG. 10 of U.S. Pat. No. 5,032,901 discloses a circuit for normalizing the color of the color background scene for input to a traditional chroma keyer.

SUMMARY OF THE INVENTION

Accordingly the present invention provides a chroma keyer with correction for background defects, such as uneven lighting and/or color temperature, creases and wrinkles, smudges, and use of colors with variations in luminance to chrominance ratios, by using a reference input which is a chroma key set, including a color background scene and any props, without a foreground object. The reference input is compared with the chroma key set with the foreground object to generate a chroma key control signal which describes only the affect that the foreground object has on the chroma key set and does not respond to the background defects. The chroma key control signal is applied to the reference input itself to suppress the color background scene as well as the background defects without artifacts. When the chroma key control signal also is used to condition a new background scene so that the foreground object may be added to it, compromises due to defects are not necessary since the chroma key control signal does not include response to them.

The objects, advantages and other novel features of the present invention are apparent from the following detailed description when read in conjunction with the appended claims and attached drawing.

DESCRIPTION OF THE PREFERRED EMBODIMENT

Figure 5:
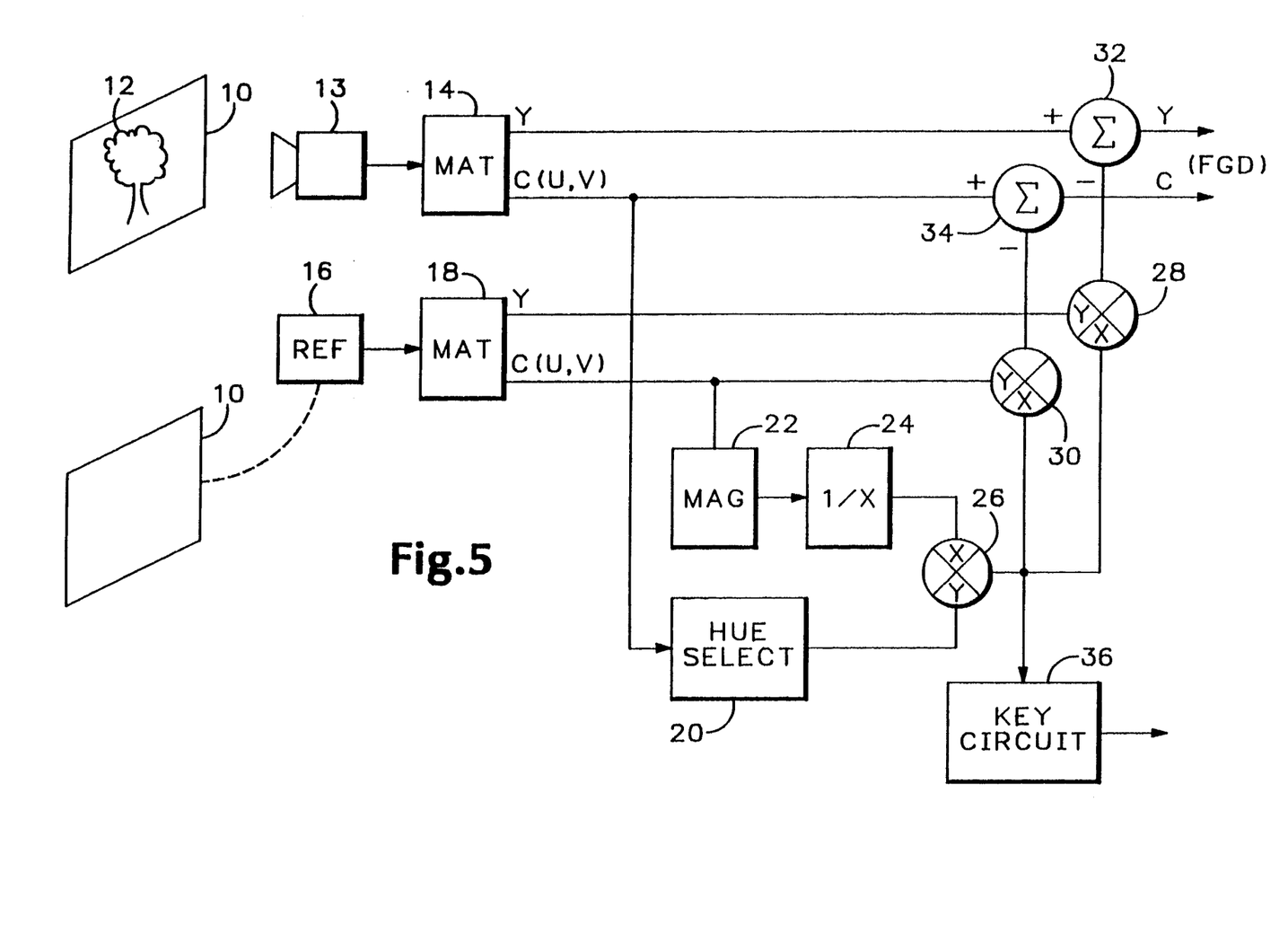
FIG. 5 is a block diagram view of a chroma keyer with correction for background defects according to the present invention.

Referring now to FIG. 5 a color background scene 10 that includes a foreground object 12 is shot by a camera 13 to produce a video signal. The video signal is input to an input translation matrix 14 to convert the video signal into luminance Y and chrominance C(U,V) components. A reference video signal, representing the color background scene 10 including props but without the foreground object 12, from a reference medium 16 is read out in synchronism with the video signal from the camera 13 and input to a reference translation circuit 18 to convert the reference signal into luminance Y and chrominance C(U,V) components. The video signal chrominance components are input to a hue selector 20, which may be of conventional construction as shown in FIG. 4 of U.S. Pat. No. 5,25 1,016 issued Oct. 5, 1993 to James A. Delwiche entitled "Chroma Keyer with Secondary Hue Selector", to generate an initial chroma control signal. The reference signal chrominance components are input to a chrominance magnitude circuit 22 which provides a magnitude signal that is equivalent to the square root of the sum of the squares of the two chrominance components U,V. The magnitude signal is input to a reciprocal circuit 24, and the reciprocal magnitude signal is multiplied by the initial chroma control signal from the hue selector 20 in a mixer circuit 26 to produce a chroma key control signal.

Figure 9:
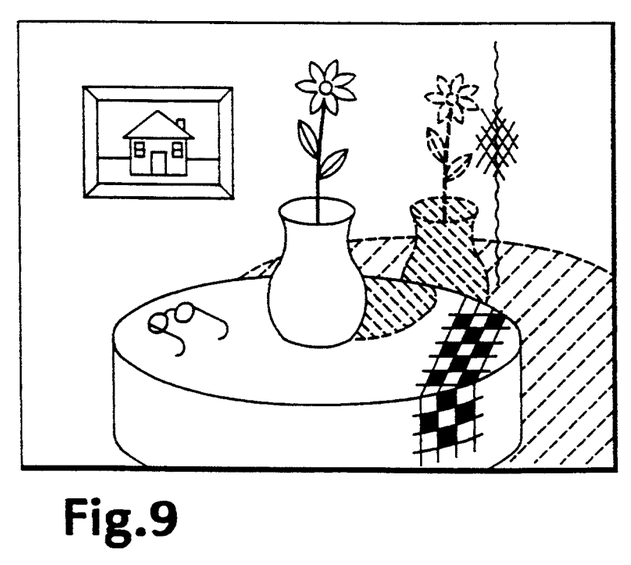
FIG. 9 is a pictorial view of the composite image as produced by the chroma keyer with correction for background defects according to the present invention.

The chroma key control signal is used in two processes—background suppression and new background shaping. Suppression is accomplished by constructing a vector for the imperfect color background scene with a hole in it where the foreground object is. The vector is constructed by scaling the vectors for the imperfect color background, as represented by the reference signal, by the chroma key control signal in mixer circuits 28, 30 for the luminance and chrominance components, respectively. The outputs from the mixers 28, 30 are subtracted from the video signal in subtractors 32, 34 so that only the foreground signal appears at the output. The chroma key control signal also is input to a key circuit 36 to generate a key signal for cutting a hole in the new background into which the foreground signal is inserted, i.e., shaping the new background. The key signal from the key circuit 36 and FGD from the subtractors 32, 34 are used by a keyer (not shown) to composite FGD with the new background. The resulting composited signal is shown in FIG. 9 without any background defects.

The reference signal may be provided by a number of sources. One source is a tape deck that plays back a recording of the chroma key set with the foreground object removed. For this source the camera may be panned or zoomed or moved so long as it matches its motion frame by frame with the camera motion applied when recording the chroma key set with the foreground object in place. Another source is a live camera shot of the chroma key set without the foreground object used in conjunction with a recording of the chroma key set with the foreground object. Here again camera motion may be applied as above. An advantage of this source over the use of a tape deck for the reference input is that suppression does not result in additional noise associated with the recording. Still another source is a framestore image of the chroma key set without the foreground object. For this source the camera needs to be locked down. An advantage here is that the framestore may use recursive noise reduction of the color background scene, as discussed below. These sources require forethought.

It is possible under some circumstances to synthesize the reference signal by playing back the color background scene with the foreground object present while selectively writing into a framestore. One criteria for the selection is based on a comparison of what is stored in the framestore and what is happening in the chroma key set, although other criteria also are possible. As the foreground object, such as a person, moves around the chroma key set, the parts of the color background scene that are revealed replace what is in the framestore so that it is possible to eventually fill in the entire color background scene. In the event that the foreground object is opaque and doesn't move to reveal some of the color background scene, then that part does not really matter. This technique does not always work, for with transparent foreground objects that don't move the foreground object disappears.

Figure 6:
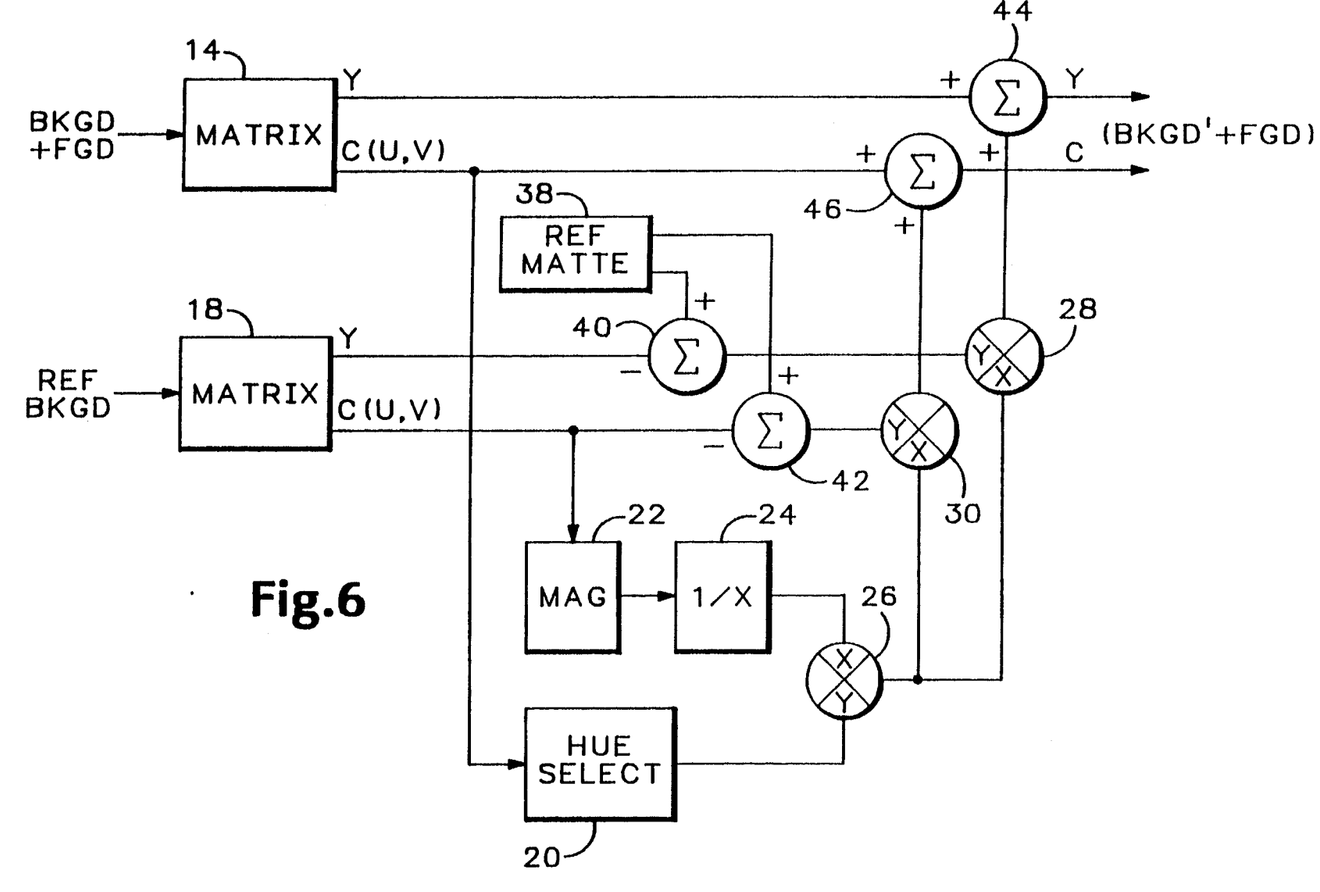
FIG. 6 is a block diagram view of a chroma keyer preprocessor with correction for background defects according to the present invention.
Figure 7:
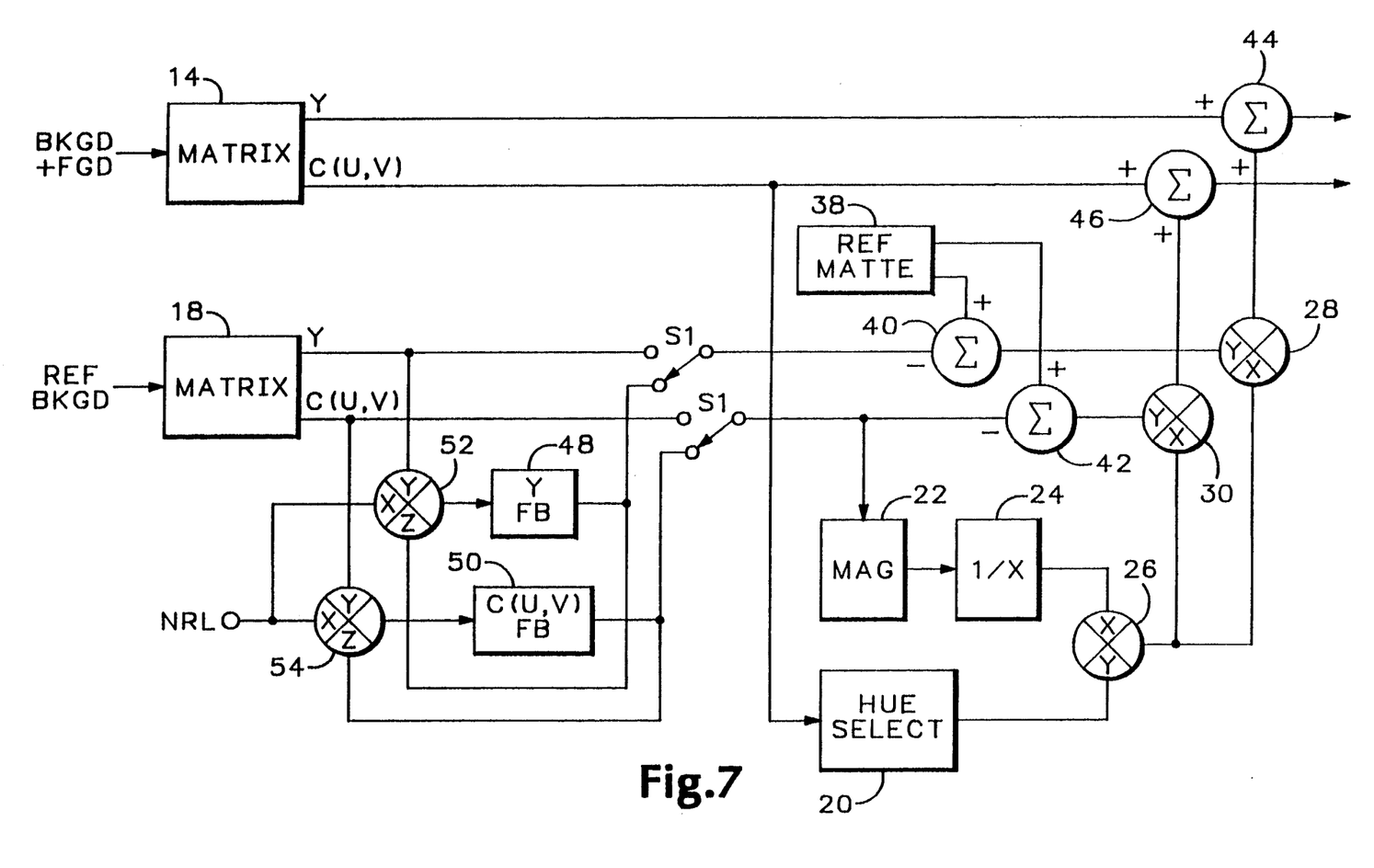
FIG. 7 is a block diagram view of a chroma keyer preprocessor with correction for background defects including noise reduction according to the present invention.
Figure 8:
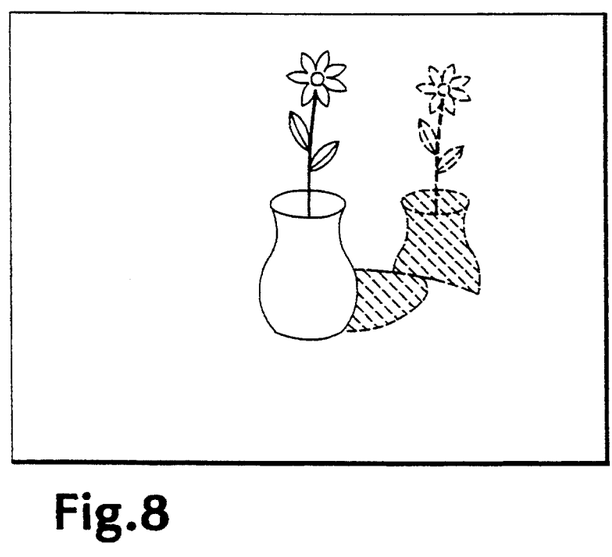
FIG. 8 is a pictorial view of the foreground object with background suppression corrected for background defects according to the present invention.

To provide the same background correction benefits for existing traditional chroma keyers, a chroma keyer preprocessor is provided, as shown in FIGS. 6 and 7, which normalizes the color background scene to a matte color. These circuits are very similar to that described in FIG. 5, but without the key circuit 36, except that a reference matte generator 38 is added together with subtractors 40, 42 and error correction is done instead of background suppression. An error signal is generated from the reference signal by subtracting it from the output of the matte generator 38, which describes a perfect background scene without defects. The error signal, representing deviations from the perfect background scene, is shaped by the chroma key control signal in mixers 28, 30 and applied to summation circuits 44, 46. The resulting output from the summation circuits 44, 46 is the foreground object 12 as if in front of a flat reference matte (FIG. 8). When this signal is input to a traditional chroma keyer, the resulting composited signal (FIG. 9) is free of the background defects since the defects are removed prior to input to the chroma keyer.

The preprocessor may include an internal frame buffer 48, 50 for noise reduction. When a single frame of the reference signal is stored in a frame buffer and used to correct the color background scene in a chroma key signal, the noise associated with that reference signal has a direct impact on the output of the preprocessor because the chroma magnitude responds to the noise there. When the hue selector 20 output is divided by the chroma magnitude, a noise gain may be experienced. This noise error follows through to the output where the background error signal is shaped and added to the foreground scene. This noise error is reduced by providing a mixer 52, 54 at the input to the frame buffer 48, 50 to combine a percentage of the reference signal with what already is in the frame buffer. Because the noise in each frame of the reference signal is not correlated with the noise of any other frame, noise does not accumulate as fast in the frame buffer 48, 50 as the signal, which is correlated. A noise reduction level NRL is set by an operator and provides the mix coefficient for the mixers 52, 54. The smaller percentage of reference signal in the mix that is accumulated in the frame store 48, 50, the more noise reduction achievable. Smaller percentages also require more reference signal flames to be stored. If the frame buffer 48, 50 starts with a black signal in it, the contents of the buffer build up as each frame is recorded. This is not necessarily desired, so the first frame recorded is stored at 100% mix, i.e., NRL=1. Then with each successive frame that is stored, the signal to noise level improves while the signal level remains constant. For a 10% mix coefficient the noise power improvement in the reference signal is 12.78 dB. Therefore a number of flames of the color background scene are stored by the reference source 16 as the reference signal to take advantage of this noise reduction feature. For no noise reduction after the first frame is stored with NRL=1, NRL is then set to zero so that the output is held in the frame buffer 48, 50. The switch S1 bypasses the frame buffer 48, 50. The reference signal may also be captured by a camera, the output of which has noise reduction applied to it while it is being stored in the frame buffer 48, 50.

Temporal filtering may also be applied to the reference signal, which is similar to having $0 < NRL < =1$. Here motion detection techniques are needed to deal with temporal artifacts caused by such motion.

Thus the present invention provides a chroma keyer with correction for background defects by comparing a reference signal that represents a color background scene including props, if any, without a foreground scene with an input signal that includes the foreground scene in the color background scene, and by using the chroma magnitude of the reference signal in the formation of a chroma key control signal from the input signal that describes how the foreground scene affects the background scene.

What is claimed is:

1. A circuit for generating a control signal for correcting background defects in a video signal having a color background portion and a foreground object portion comprising:

means for generating an initial chroma control signal from a chrominance component of the video signal;

means for modifying the initial chroma control signal as a function of the magnitude of a chrominance component of a reference signal representing the color background portion without the foreground object portion to produce a chroma key control signal; and means for combining the chroma key control signal with the reference signal to generate the control signal.

2. The circuit as recited in claim 1 further comprising means for generating from the reference signal an error signal for input to the combining means for combining with the chroma key control signal to generate the control signal.

3. The circuit as recited in claim 2 further comprising means for reducing noise in the reference signal prior to generating the error signal.

4. The circuit as recited in claim 3 wherein the reducing means comprises:

a mixer having a first input coupled to receive the reference signal and a second input, having a control terminal coupled to receive a noise reduction coefficient, and having an output to provide a modified reference signal; and a framestore having an input coupled to receive the modified reference signal from the mixer for storage and having an output coupled to the second input of the mixer, the output providing the modified reference signal as the reference signal for input to the error signal generating means.

5. The circuit as recited in claims 2 or 3 further comprising means for correcting the video signal for background defects as a function of the control signal to produce a corrected video signal.

6. The circuit as recited in claim 5 wherein the correcting means comprises a combining circuit for adding the error signal to the video signal to produce a corrected video signal without the background defects.

7. The circuit as recited in claim 1 wherein the initial chroma control signal generating means comprises a hue selector having the chrominance component of the video signal as an input and providing the initial chroma control signal as an output.

8. The circuit as recited in claim 7 wherein the initial chroma control signal generating means comprises means for converting the video signal into a component video signal having a luminance component and the chrominance component.

9. The circuit as recited in claim 1 wherein the modifying means comprises:

means for generating a magnitude signal from the chrominance component of the reference signal; and means for dividing the initial chroma control signal by the magnitude signal to produce the chroma key control signal.

10. The circuit as recited in claim 1 wherein the combining means comprises a mixer for multiplying the reference signal by the chroma key control signal to generate the control signal.

11. The circuit as recited in claim 1 wherein the error signal generating means comprises:

a matte generator for producing a uniform color signal corresponding to a nominal color for the color background portion; and a summation circuit for subtracting the reference signal from the uniform color signal to generate the error signal.

12. The circuit as recited in claim 1 further comprising means for suppressing the color background portion from the video signal as a function of the control signal.

13. The circuit as recited in claim 12 wherein the suppressing means comprises a summation circuit for subtracting the control signal from the video signal to produce an output video signal that includes only the foreground object without the background defects.

14. The circuit as recited in claim 1 further comprising means for generating a key signal as a function of the chroma key control signal.

* * * * *